Sept. 9, 1969 WOO F. CHOW ET AL 3,466,624

ARRANGEMENT FOR LIMITING THE CURRENT IN A FERROMAGNETIC FILM

Filed Sept. 29, 1965

INVENTORS
WOO F. CHOW
JOHN B. SCHWARZ

BY Rene A. Kuypers

ATTORNEY 3,466,624

ARRANGEMENT FOR LIMITING THE CURRENT IN A FERROMAGNETIC FILM

Woo F. Chow, Horsham, and John B. Schwarz, Abington, Pa., assignors to Sperry Rand Corporation, New York, N.Y., a corporation of Delaware Filed Sept. 29, 1965, Ser. No. 491,259
Int. Cl. G11b 5/00
U.S. Cl. 340—174 5 Claims

ABSTRACT OF THE DISCLOSURE

The invention relates to an arrangement for limiting the bit steering current generated in a multiple mismatch to within safe limits such that stored information is not destroyed. This is accomplished by forming a variable inductance loop which is juxtaposed to the memory. By controlling the inductance the impedance can be varied to handle the maximum amount of current through the memory.

This invention relates in general to a digital storage element. In particular, this invention relates to a technique for limiting the current flow in a plated wire memory element to a safe limit so that information stored along its length is not disturbed.

When the bit current steering technique is used in the interrogation process of a content-addressable memory using plated magnetic wires, the impedance of the word loop (i.e, the plated wire along which is stored a plurality of bits comprising a word) has to be small so that when there is a single mismatch bit, a current of sufficient magnitude is generated. This current has to be of sufficient magnitude so as to steer the temporary register bit (the flag register) into the mismatch position. However, when several bits of one word are interrogated simultaneously, the current generated in the loop may become too large when there is more than one mismatch bit. This large current may disturb or can even destroy the stored information along the plated wire. Therefore, a current limiting device is required in the plated wire word loop in order to prevent a destruction of information along its length. This current limiting device should present a low impedance to the current which flows as a result of a single mismatch.

Accordingly, it is an object of this invention to provide a new and improved current limiting scheme for a data storage element.

It is another object of this invention to provide a new and improved current limiting scheme for a plated magnetic wire.

The novel features that are considered characteristic of this invention are set forth with particularity in the appended claims. The invention itself, however, both to its organization and method of operation, as well as additional objects and advantages thereof, will best be understood from the following description when considered in conjunction with the accompanied drawings wherein:

Figure 1:
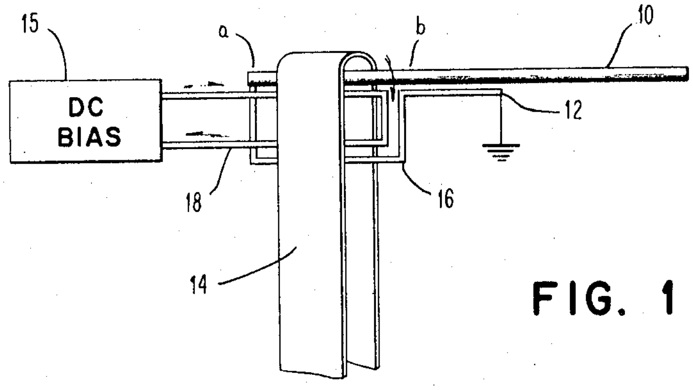
FIGURE 1 depicts the current limiting device utilized in conjunction with a plated wire storage element.

Referring now to FIGURE 1, a plated wire 10 is shown which is adapted to store binary information along its length. In a preferred embodiment, the plated wire 10 consists of a 5 mil diameter beryllium-copper wire substrate having a thin magnetic film formed on the surface thereof. The thin magnetic film is electroplated on the wire substrate with approximately a 10,000 Angstrom thickness of Permalloy (i.e., nickel-iron alloy). The Permalloy film has the approximate ratio of 80% nickel and 20% iron. The Permalloy film is electroplated in the presence of a circumferential magnetic field that establishes a uniaxial anisotropy axis at right angles (i.e., around the circumference) to the longitudinal axis of the wire along its length. The uniaxial anisotropy establishes easy and hard directions of magnetization and the magnetization vectors of the thin film are normally oriented in one of two equilibrium positions along the easy axis, to thereby establish two bistable states necessary for binary logic operation. In other words, any location along the plated wire 10, which is termed a bit position, has two states of stable magnetic remanence and is adapted to be switched into either of said two states.

Positioned in juxtaposition to the plated wire 10 is the ground plane 12. The ground plane or the return path 12, which is shown schematically, is conventionally a metal substrate and is properly grooved to receive the plated wire 10. The ground plane 12 in conjunction with the plated wire 10 approximaets a coaxial line wherein the plated wire 10 is the inner conductor and the grooved ground plane 12 is the outer conductor. The inner conductor and the outer conductor are separated by a thin insulating surface (not shown) formed on the ground plane 12 or on the plated wire 10.

The impedance of the plated wire 10 operating as a coaxial line is very low whenever the plated wire 10 and its return 12 are physically very close together. The reason that the impedance is low when the plated wire 10 and its ground return 12 are very close is that the inductance of this part of the word loop is relatively low. The reason why the inductance of the word loop is relatively low can be shown by the following formula where $$L=\frac{N\phi}{I}$$

and $$\phi=BA$$

It can readily be seen that as the cross-sectional area A or the space between the plated wire 10 and its return 12 becomes low, the flux $\phi$ linking the loop will also be low. Accordingly, if $\phi$ is low the inductance will be low, resulting in a low word loop impedance. The word loop impedance must be low so that sufficient current can be generated to accomplish bit steering in the event a single mismatch is obtained in an associative memory arrangement. A complete description of bit steering is found in the copending patent application of Woo F. Chow, Ser. No. 466,904, filed June 25, 1965. Summarizing this invention briefly, information can be readily transferred along a plated wire from one location to another location since sufficient steering current can be generated by the read out of the information in the first location because of its low impedance so as to transfer the information to the second location.

In order to provide the current limiting technique for the plated wire 10 in the event that too much current is developed therein, a non-linear inductance is connected to the end thereof. This inductance comprises the loop 16 formed at the end of the ground plane 12. The loop 16 may comprise, in actual embodiment, a printed circuit conductor formed in the shape shown and connected at one end to the ground plane 12 and at the other end to the plated wire 10. Since the loop 16 effectively moves the plated wire 10 at a greater distance from the ground plane 12, the inductance is somewhat larger than that where the plated wire and its return are closer in view the discussion in the above paragraph. However, the inductance loop 16 is sufficiently low so that it does not effect bit steering for a single mismatch. The plated wire 10 between locations *a* and *b* is magnetized in the same direction along its easy axis and, by way of example, is magnetized in a clockwise direction (as viewed from *a* to *b*) for reasons that will be discussed hereinafter. The inductance provided by the loop 16 is made variable in the following manner.

A coupling loop 18 is oriented in juxtaposition to the inductance loop 16. The coupling 18 is adapted to be connected to external D.C. bias circuitry 15. The D.C. bias circuitry 15 causes current to flow in the direction shown so that a magnetizing field is generated which is in the same direction as the easy axis magnetization along section *a–b* of the plated wire 10.

Figure 2:
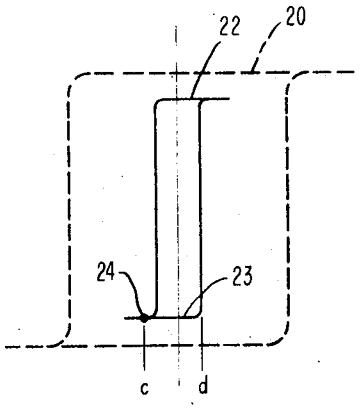
FIGURE 2 depicts the square hysteresis characteristic of a section of the plated wire storage element depicted in FIGURE 1.

A drive strap 14 is positioned substantially orthogonal to the plated wire 10 and between the section *a–b*. It should be noted that the strap 14 is additional to the plurality of drive straps (not shown) conventionally positioned along plated wire 10 other than at the location *a–b*. The magnetic film along the plated wire 10 between locations *a* and *b* has a square hysteresis characteristic 20 as shown in FIGURE 2. The square hysteresis characteristic 20 is the magnetic characteristic of the plated wire 10 along its easy axis of magnetization. When the strap 14 is energized, it generates a hard axis field which is applied to the magnetic film location along section *a–b* of plated wire 10. The hard axis field causes the hysteresis characteristic 20 to narrow and the area inside of the loop to become smaller so that it assumes the hysteresis characteristic 22. In effect, $H_c$ of the hysteresis characteristic is made smaller and is controllable by the hard axis field applied. The amplitude of the current applied to the strap 14 is such that it causes the hysteresis characteristic 22 width to equal the distance *c–d*. This distance is equivalent to the desired amplitude of the loop current in the plated wire 10 which will prevent it from destroying information stored along its length whenever several mismatches are detected during an associative memory search.

The section *a–b* along plated wire 10 is assumed to have a remanant state of magnetization position at location 23 of the easy axis hysteresis characteristic 22. However, since in accordance with this invention it is required that the distance *c–d* of the easy axis hysteresis characteristic 22 comprise the desired amplitude of the loop current in the plated wire 10, the remanant state of the location *a–b* along the plated wire 10 is biased to saturation indicated by the position 24. This biasing is accomplished in the following manner.

As mentioned above, current flows in the coupling loop 18 so that it generates a magnetic field which is in the same direction as the magnetization along the easy axis of the section *a–b*. The section *a–b* therefore becomes more saturated and its remanant state is transferred from the location 23 to the location 24 of the easy axis hysteresis characteristic 22. The transfer of the remanant state of the hysteresis characteristic 22 from the position 23 to the position 24 establishes the regulation of the current in the plated wire 10. This regulation is obtained by a non-linear variation of the inductance of the section *a–b* along plated wire 10. Thus, as long as the current in the plated wire 10 keeps the operating point along within the horizontal portion of the easy axis hysteresis characteristic 22 the inductance along section *a–b* will be at a minimum value. This can be readily appreciated by referring to the following formula:

$$L \approx \mu B/H = \frac{\phi/A}{KI}$$

By reference to the above formula it can be readily appreciated that as long as the change of current within the plated wire 10 operates along the horizontal portion of the square hysteresis loop 22, there will be little or no change in the flux density, B. Therefore the inductance will be relatively small valued. However, when the current in the plated wire 10 causes the operating point to begin traversing the vertical portion of the square hysteresis characteristic 22, the variable inductance becomes high valued. This can be readily appreciated by referring again to the formula above.

Thus, the variable inductance rises along the vertical portion of the square hysteresis loop 22 since for a small increase in current, there is a corresponding large increase in flux density, B, developed. Hence, a small increase in loop current in the plated wire 10 beyond the desired operating point causes the inductance of the loop to increase greatly. The nicreased loop inductance causes the loop impedance to increase so that it absorbs the extra voltage produced by the multiple bit mismatch and keeps the loop current well within the safe operating range.

In summary, this invention relates to a technique for controlling the current in a magnetic storage element and in particular relates to a technique for controlling the current in a plated wire memory element. The technique consists in connecting a variable impedance to the plated wire. This variable impedance is controlled by the amount of current flowing in the wire itself. Thus, when the current is within safe operating limits the variable impedance has a very low value so that it does not affect the normal operation of the plated wire. On the other hand, when the current exceeds a specified limit, the impedance increases to a relatively high value. The increased loop impedance absorbs the extra voltage produced due to the increased voltage and hence keeps the current in the plated wire well within the safe range. This invention also controls the desired amplitude of the loop current by compressing the hysteresis characteristic of the variable impedance.

Obviously, many modifications and variations of the present invention are possible in the light of the above teachings. It is therefore to be understood that within the scope of the appended claims, the invention may be practiced otherwise than as specifically described.

The embodiments of the invention in which an exclusive property or privilege is claimed are defined as follows:

1. The combination comprising:
(a) a storage element comprising a ferromagnetic film exhibiting a preferred axis of magnetization as well as a square B–H hysteresis characteristic;
(b) sense means coupled to said storage element;
(c) means coupled magnetically to said storage element to compress said square B–H characteristic;
(d) means further compled magnetically to said storage element to alter the operating point of said storage element along said H portion of said hysteresis characteristic, the width of said H value being approximately equivalent to the desired amplitude of the current flowing through said sense means.

2. The combination comprising:
(a) a wire substrate having a thin film with the property of uniaxial anisotropy;
(b) a ground means positioned in close proximity to said wire,
said ground means formed into a loop at the end of said wire wherein one end is connected thereto;
(c) a conductor positioned in juxtaposition to said loop and said wire for compressing the hysteresis loop of said film;
(d) means magnetically coupled to said wire end for saturating said magnetic film section.

3. The combination in accordance with claim 2 wherein said loop at the end of said wire forms a variable inductance whose value is controlled by the hard axis field generated by said conductor means.

4. The combination in accordance with claim 3 wherein the operating point on said compressed hysteresis loop is determined by D.C. means connected to said means for saturating said film.

5. The combination comprising:
(a) a plated wire including a magnetic coating having the property of uniaxial anisotropy including an EASY axis which is circumferential and a HARD axis which is along the longitudinal dimension;
(b) a ground means positioned in close proximity to said wire,
a portion of said ground means and wire being formed into a variable inductance means;
(c) means for providing a HARD axis field near said inductance means for reducing the magnetic characteristic of said wire at said portion;

(d) coupling means juxtaposed to said inductance means for controlling the amplitude of the current in said wire.

References Cited

UNITED STATES PATENTS

| | | | |
|---|---|---|---|
| 3,039,891 | 6/1962 | Mitchell | 340—174 XR |
| 3,366,939 | 1/1968 | Chanteloup | 340—174 |

BERNARD KONICK, Primary Examiner

GARY M. HOFFMAN, Assistant Examiner